Sept. 18, 1962 L. H. LOGUE 3,054,230
SAND SCRUBBER
Filed March 13, 1959

INVENTOR.
LELAND H. LOGUE
BY
*McGrew & Edwards*
ATTORNEYS 3,054,230
SAND SCRUBBER
Leland H. Logue, Denver, Colo., assignor to Denver Equipment Company, Denver, Colo., a corporation of Colorado
Filed Mar. 13, 1959, Ser. No. 799,262
8 Claims. (Cl. 51—163)

This invention relates to sand scrubber apparatus, and more particularly to scrubber apparatus of the type in which a fluent charge of sand or the like is subjected to attrition or repeated scouring influences through a circuitous course of treatment.

Many naturally-occurring materials have surface stains or contaminants which require their removal before the material is suited for industrial uses. For example, glass sands, potash, beach sands and feldspar are compositions particularly benefited by treatment in the apparatus of my invention. For many glass making operations, the sand grains or silica must be essentially clean to prevent any chemical reaction or other variation in composition which lessens the uniformity of the properties of the glass.

In order to completely scour or clean the entire surface of each individual grain or particle, a long period of attrition is provided with considerable movement and tumbling in apparatus now available for such treatments, and the horsepower requirements render such treatments costly. If lesser horsepower is provided, the efficiency of the scouring lessens.

Accordingly, it is an object of my invention to provide simple, durable and efficient sand scrubbing apparatus which is capable of treating a large volume of material with lower power consumption.

Another object of my invention is to provide simple, durable and efficient sand scrubbing apparatus providing a progressive movement through a series of treatment stages with a substantial degree of countercurrent movement at each stage providing a high degree of attrition.

A further object of my invention is to provide simple, durable and efficient sand scrubbing apparatus providing a progressive course of movement by associated concurrent and countercurrent impelling influences with a high degree of attrition deriving from the opposition of the concurrent and countercurrent influences.

Other objects reside in novel details of construction and novel combinations and arrangements of parts, all of which will be fully described in the course of the following description.

Figure 1:
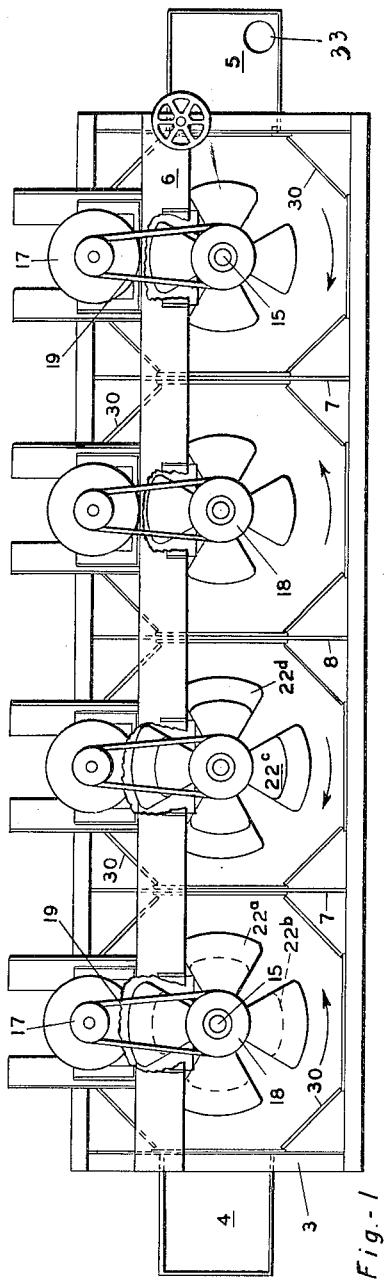
Figure 2:
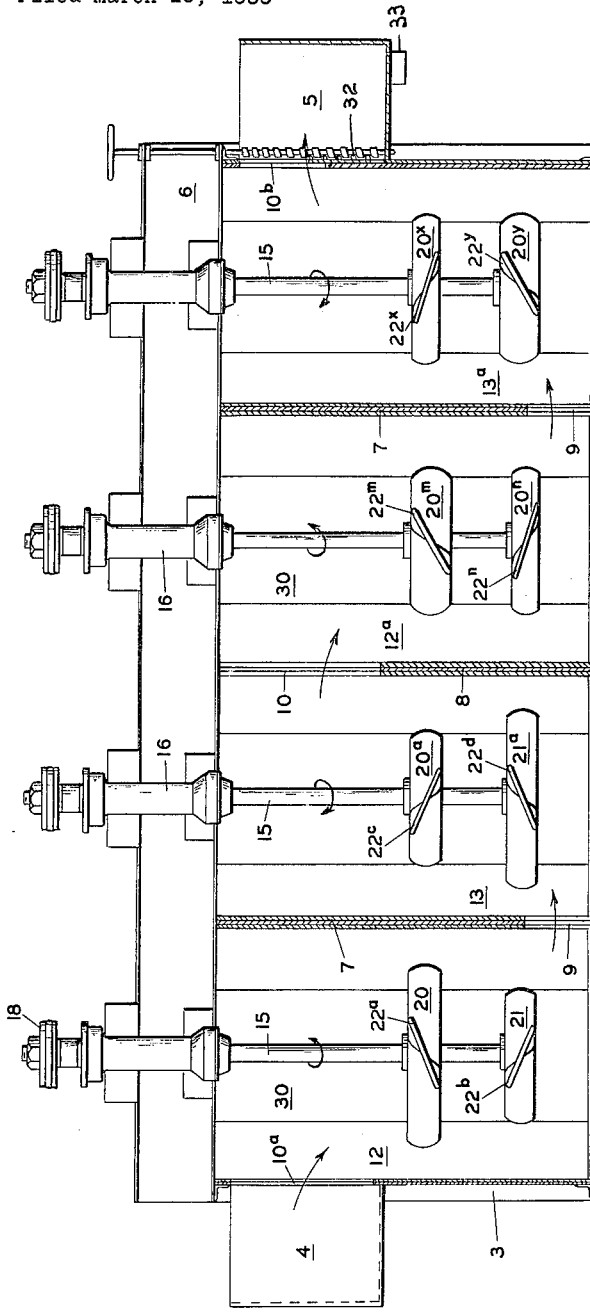

The practice of my invention may be performed in a variety of apparatus and the accompanying drawings illustrate typical apparatus for the practice of the invention. In the drawings in the two views of which like parts bear similar reference numerals, FIG. 1 is a top plan view of a four cell scrubber apparatus according to my invention, and FIG. 2 is a vertical section through the apparatus of FIG. 1.

The practice of my invention will be described with reference to the structural embodiment shown in FIG. 2. The tank 3 has a feed box 4 at one end, a discharge box 5 at its opposite end, and superstructure 6 extending lengthwise of said tank along its top. The interior of the tank is divided by one or more partitions 7 and one or more partitions 8 into a plurality of cells, here shown as four.

Each partition 7 has a slotted opening 9 at its bottom while each partition 8 has a slotted opening 10 at its top.

The several cells 12, 12a, 13 and 13a of the tank are of the same size, but cells 12 and 12a have a top inlet such as the slotted opening 10 or a corresponding outlet 10a of feed box 4, while the cells 13 and 13a have a bottom inlet provided by the slotted opening 9, and the last cell 13a of the tank has a slotted opening 10b, corresponding to the openings 10, which functions as the tank discharge outlet into discharge box 5. Flow through opening 10b, which functions as a weir, is controlled by a manually adjustable gate 32, and discharge through box 5 is through a nipple 33 adapted for reception of a line (not shown) for conducting it from said treatment.

A rotary shaft 15 journaled in bearings within a bearing housing 16 mounted on superstructure 6 extends downwardly into the bottom portion of each cell 12, 12a, 13 and 13a and carries a plurality of bladed impellers at its lower end in vertically spaced relation. An electric motor or other prime mover 17 drives a sheave 18 on each shaft 15 through a belt 19 or other suitable transmission to rotate the shaft 15, the direction of rotation being indicated by the arrow adjoining each such shaft in FIG. 2.

Cells 12 and 13 have an arrangement of impellers in which the impellers are of different diameter but have blades pitched at the same angle. The upper impeller 20 of cell 12 is of larger diameter than its associated lower impeller 21 with the blades 22a of the upper impeller pitched at the same angle as the blades 22b of the lower impeller but in the opposite direction. With this arrangement, the upper impeller directs material in cell 12 downwardly while lower impeller 21 directs the material upwardly in countercurrent flow. As impeller 20 has a greater output capacity than impeller 21, there is a progressive movement of material from inlet 10a to outlet 9 of cell 12.

Cell 13 has an opposite arrangement in which the upper impeller 20a is of smaller diameter than the lower impeller 21a, with blades 22c of impeller 20a pitched at the same angle as blades 22d of impeller 21a but in opposite direction. The capacity of impeller 21a being greater, the flow of material in cell 13 is from bottom inlet 9 to upper outlet 10 while impeller 20a moves some of the material countercurrent to such flow.

Cells 12a and 13a have a circulation of material corresponding to cells 12 and 13 respectively, but differ as to impeller arrangement in that the impellers are of the same diameter but have blades pitched at different angles.

In cell 12a, upper impeller 20m has its blades 22m pitched at a greater angle than the blades 22n of the lower impeller 20n but in an opposite direction, thereby inducing flow from top to bottom, while in cell 13a the flow is from bottom to top and thence through outlet 10b, with impellers 20x and 20y of the same diameter and blades 22y of the lower impeller pitched at a greater angle to the horizontal than blades 22x of the upper impeller so as to provide greater output capacity.

In a typical operation a charge of sand to be scrubbed is fed into feed box 4 from a suitable source of supply (not shown) and enters cell 12 through inlet opening 10a. The sand will be mixed with enough water to render it free flowing, but suspension of the particles in a carrier liquid is not required in this treatment. The impeller 20 directs the sands toward the bottom of cell 12 and impeller 21 is arranged to interrupt the flow and direct a substantial portion of the sands countercurrent to the descending flow. As upper impeller 20 has a greater output capacity, a continuous or progressive flow between inlet 10a and outlet 9 is maintained, but intense attrition and scouring occur in the countercurrent zone, which is supplemented by the less intense scouring of the progressive movement.

The length of particle travel through a cell including the delayed movement through the countercurrent zone between the impellers serves to bring each particle into a multitude of contacts with other particle surfaces, and the packed condition of the sands in said flow insures ample attrition over the entire surface to provide a thorough scouring. The change in direction of flow in successive cells assists in bringing new surfaces into rubbing contact.

Thus the discharge of sands through opening 9 into cell 13 proceeds at the rate at which sands discharge from cell 13 through the upper opening 10 into cell 12a, and a substantially uniform flow rate is maintained throughout the course of treatment without excessive power consumption and with adequate mixing and rubbing at each stage. The impellers 20m and 20n, 20x and 20y function in the same manner as those previously described although utilizing a different structural arrangement.

In a typical installation the blades 22n may be constructed on a helix with a lead which gives a pitch of 100% per turn, while the blades 22m would give a 125% pitch per turn, to maintain enough excess output capacity to satisfy the required flow rate. Blades 20y would have the same pitch as blades 20m and blades 20x the same as blades 20n, and these impellers would have a diameter of twenty-four inches.

By comparison, impeller 20 has a twenty-four inch diameter at 100% pitch while impeller 21 has a diameter of eighteen inches. Each has its respective blades 22a and 22b disposed at the same angle to the horizontal although inclining in opposite directions. As impeller 20 has greater output capacity than impeller 21, it directs flow through cell 12 from inlet 10a to outlet 9, and the rate of such flow is essentially the same as in cells 13, 12a and 13a.

Operations of the type performed in cells 12, 13, 12a and 13a have an abrasive action on the tank and all moving parts in the tank. In order to avoid excessive wear, I provide a special liner arrangement comprising a multi-side tubular body 30 having openings arranged to register with the openings 9 and 10 or corresponding inlets and outlets. Whenever wear results in a given liner becoming unfit for further service, it may be removed from the tank with a similar unit substituted therefor without disturbing the other liner units.

I claim:

1. Sand scrubbing apparatus comprising a tank having a feed inlet and a discharge outlet at opposite ends and a plurality of partitions dividing its interior into a series of cells, a rotary shaft in each said cell, upper and lower impellers mounted on each shaft adjacent its lower end arranged to move material in the cell in countercurrent relation, one said impeller being of greater capacity than the other so as to induce a progressive flow of material through the cell, and the succession of cells having alternating lower and upper discharge outlets so as to provide a circuitous up and down course of movement between inlet and outlet.

2. Sand scrubbing apparatus comprising a tank having a feed inlet and a discharge outlet at opposite ends and a plurality of partitions dividing its interior into a series of cells, a rotary shaft in each said cell, upper and lower impellers mounted on each shaft adjacent its lower end arranged to move material in the cell in countercurrent relation, one said impeller being of greater capacity than the other and having blades pitched at a different angle than the other so as to induce a progressive flow of material through the cell, and the succession of cells having alternating lower and upper discharge outlets so as to provide a circuitous up and down course of movement between inlet and outlet.

3. Sand scrubbing apparatus comprising a tank having a feed inlet and a discharge outlet at opposite ends and a plurality of partitions dividing its interior into a series of cells, a rotary shaft in each said cell, upper and lower impellers mounted on each shaft adjacent its lower end arranged to move material in the cell in countercurrent relation, one said impeller being of greater capacity and diameter than the other so as to induce a progressive flow of material through the cell, and the succession of cells having alternating lower and upper discharge outlets so as to provide a circuitous up and down course of movement between inlet and outlet.

4. Sand scrubbing apparatus comprising a tank having a feed inlet and a discharge outlet at opposite ends and at least one partition dividing its interior into a plurality of cells, a rotary shaft in each said cell, upper and lower impellers mounted on each shaft adjacent its lower end arranged to move material in the cell in countercurrent relation, both said impellers being of the same diameter but of different and opposed blade pitch so as to cause opposed scouring sand movements and a progressive flow of material through the cell, and the succession of cells having alternating lower and upper discharge outlets so as to provide a circuitous up and down course of movement between inlet and outlets.

5. Sand scrubbing apparatus comprising a tank having a feed inlet and a discharge outlet at opposite ends and at least one partition dividing its interior into a plurality of cells, a rotary shaft in each said cell, pairs of upper and lower impellers mounted on each shaft adjacent its lower end arranged to move material in the cell in countercurrent scouring relation, at least one of said pairs of upper and lower impellers being of different diameter but of the same blade pitch, and at least one other of the pairs of upper and lower impellers being of the same diameter but of different blade pitch, and all of said pairs of upper and lower impellers being of opposite pitch so as to induce progressive flow of material through the cells, and the succession of cells having alternating lower and upper discharge outlets so as to provide a circuitous up and down course of movement between inlet and outlets.

6. Sand scrubbing apparatus comprising a tank having a feed inlet and a discharge outlet at opposite ends and a plurality of partitions dividing its interior into a series of cells, a rotary shaft in each said cell, upper and lower impellers mounted on each shaft adjacent its lower end arranged to move material in the cell in countercurrent scouring relation, one said impeller being of greater capacity than the other so as to induce a progressive flow of material through the cell, and the succession of cells having alternating lower and upper discharge outlets so as to provide a circuitous up and down course of movement between inlet and outlet, and each cell having a liner arrangement comprising a multi-sided tubular body having openings arranged to register with the inlet and outlet of each cell.

7. Sand scrubbing apparatus comprising a tank having a feed inlet and at least one partition dividing its interior into a series of cells, a rotary shaft in each said cell, upper and lower impellers mounted on each shaft adjacent its lower end arranged to move material in the cell in countercurrent scouring relation to the main flow of said material, both said impellers being of the same diameter but of different and opposed blade pitch so as to induce progressive flow of material through the cell, and the succession of cells having alternating lower and upper discharge outlets so as to provide a circuitous up and down course of movement between inlet and outlets.

8. Sand scrubbing apparatus comprising a tank having a feed inlet and a discharge outlet at opposite ends and at least one partition dividing its interior into a series of cells, a rotary shaft in each said cell, upper and lower impellers mounted on each shaft adjacent its lower end arranged to move material in the cell in countercurrent scouring relation to the main flow of said material, said upper and lower impellers being of different diameter but of the same blade pitch, and the succession of cells having alternating lower and upper discharge outlets so as to provide a circuitous up and down course of movement between inlet and outlets.

References Cited in the file of this patent

UNITED STATES PATENTS

| | | |
|---|---|---|
| 2,081,850 | Darby | May 25, 1937 |
| 2,358,679 | Zacher | Sept. 19, 1944 |
| 2,570,042 | West | Oct. 2, 1951 |
| 2,845,936 | Boynton | Aug. 5, 1958 |